United States Patent Office 3,292,448
Patented Dec. 20, 1966

3,292,448
MANIFOLD PRESSURE OPERATED THROTTLE VALVE SYSTEM FOR A MULTIPLE SPEED RATIO POWER TRANSMISSION MECHANISM
Donald L. Roskopf, Grosse Ile, and Richard A. Snyder, Garden City, Mich., assignors to Ford Motor Company, Dearborn, Mich., a corporation of Delaware
Filed Oct. 14, 1963, Ser. No. 315,904
3 Claims. (Cl. 74—472)

Our invention relates generally to a control valve system for a multiple speed ratio automatic power transmission mechanism for use in an engine powered automotive vehicle driveline, and more particularly to a transmission control valve system having a throttle valve that responds to changes in engine intake manifold pressure to establish an engine load signal that may be utilized by other valve components of the valve system to initiate changes in driving speed ratios.

Our invention is an improvement in the control valve system shown in U.S. Patent No. 3,095,755 issued to James J. Duffy. It is an improvement also in the invention disclosed in application Ser. No. 277,855, filed on May 3, 1963 by Richard L. Leonard and Robert P. Zundel. Both the patent and the co-pending application are assigned to the assignee of our instant invention, and reference may be had thereto for the purpose of supplementing this disclosure.

In the control valve systems of the Duffy patent and the Leonard-Zundel application, the pressure in the intake manifold of the fuel-air induction system of the engine acts upon a pressure modulator valve assembly, identified as a throttle valve, which produces a pressure signal that is related in magnitude to the engine load. The throttle valve is supplied with fluid pressure by an engine driven pump that functions also as a pressure source for the other elements of the automatic control valve system.

The power transmission mechanisms used with these valve systems each include a hydrokinetic torque converter having an impeller and a turbine disposed in fluid flow relationship in a hydrokinetic torus circuit. The impeller is connected to the crankshaft of the internal combustion vehicle engine and the turbine is connected to a power input gear element of a multiple speed ratio gear system, the power output element of the latter being connected to the vehicle traction wheels through a suitable driveline. The relative motion of the elements of the gear system can be controlled by a pair of friction clutches and a pair of brakes so that any one of several forward driving speed ratios or a single reverse speed ratio can be obtained.

The control system includes fluid pressure operated servos for engaging and releasing the transmission clutches and brakes in timed sequence. Control pressure is delivered to the servos from a fluid pressure source.

The pressure made available to the control valve system by the pressure source is regulated by a main regulator valve system so that the desired control pressure level may be maintained. This level is determined by the operating torque requirements for the various driving conditions.

It is necessary in a system of this type to cause the main regulator valve system to respond to changes in engine load so that the pressure that is made available to the friction clutches may be at an optimum value for the particular design characteristics of the clutches. For this reason the main regulator valve system is disposed in a subcircuit of which the throttle valve forms a part so that variations in the throttle valve pressure signal thus may cause a change in the regulating characteristics of the main regulator valve. It has been found, however, that manufacturing tolerances in the throttle valve mechanism and the control valve system, as well as in the main regulator valve system itself, make it difficult to establish with a known degree of accuracy the relationship between throttle pressure and regulated control pressure. When transmission mechanisms are produced in mass production quantities, it has been found that the regulated control pressure may vary as much as 35 p.s.i. for any given engine intake manifold pressure under wide open engine throttle driving conditions. It is an object of our invention, therefore, to provide a throttle valve system wherein provision is made for controlling more precisely the relationship between throttle pressure and main regulated control pressure.

The control valve systems of this type include shift valves that respond to throttle pressure and a speed signal provided by a governor valve mechanism that is connected to the driven portions of the gear system. The shift valves control the distribution and exhaust of pressure to and from the various servos for the clutches and brakes in response to variations in the throttle pressure and speed signal. It has been found, however, that for any given control system design, the speed at which the shift valves respond to changing vehicle speed for any given engine manifold pressure will vary between relatively wide limits. For example, the driven speed of the power output member of the gear system may be as much as 1,000 r.p.m. higher for any given engine manifold pressure than the corresponding shift point for another transmission of the same design and having the same nominal size and performance characteristics. It is another object of our invention, therefore, to provide a transmission control valve system wherein provision is made for controlling more precisely the shift points for various driving conditions.

It is another object of our invention to provide an improved control valve system in which the so-called "shift feel" can be controlled and maintained at a calibrated high degree of quality by maintaining an optimum line pressure during the shift interval for any given engine manifold pressure.

It is another object of our invention to provide a power transmission mechanism in an automatic control valve system wherein the magnitude of the control pressure made available to the valve system can be controlled so that the required capacity for the friction elements of the transmission mechanism can be established with a high degree of accuracy.

Further objects and features of our invention will become apparent from the following description and from the accompanying drawings, wherein.

Figure 1:
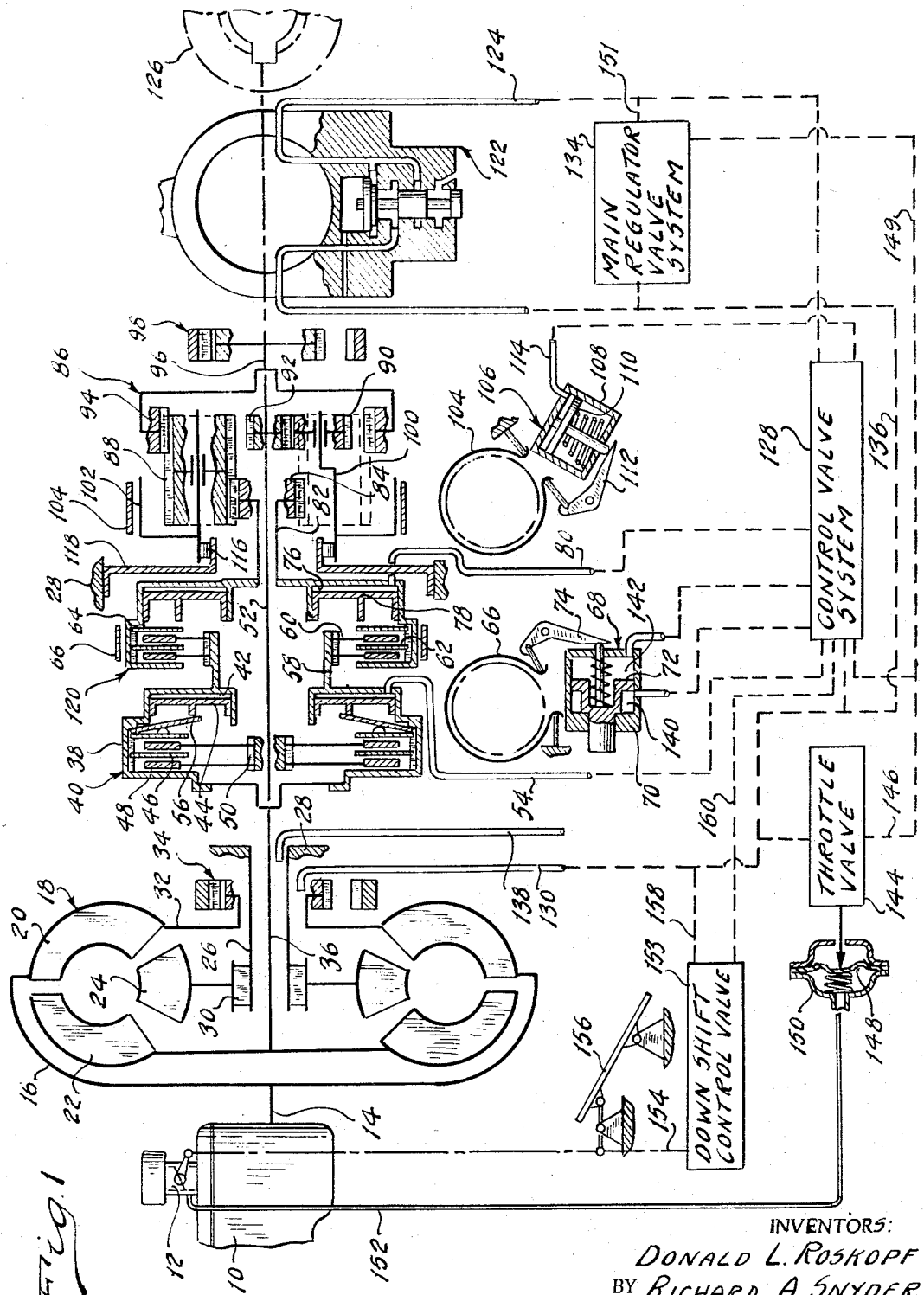
FIGURE 1 shows in schematic form an assembly view of an automatic power transmission and control system capable of embodying the improvements of our invention.

Referring first to FIGURE 1, numeral 10 designates an internal combustion vehicle engine having an air-fuel induction system with a throttle controlled carburetor throat 12. The engine crankshaft 14 is connected drivably to an impeller drive shell 16 for a hydrokinetic torque converter unit 18. The unit 18 includes a bladed impeller 20, a bladed turbine 22 and a bladed stator 24, all of which are disposed in toroidal fluid flow relationship in a common torus circuit.

Stator 24 is mounted upon a stationary sleeve shaft 26 which is connected to a relatively stationary transmission housing shown in part at 28. An overrunning brake 30 establishes a one-way connection between stator 24 and shaft 26. It inhibits rotation of stator 24 in one direction but accommodates freewheeling motion thereof in the direction of rotation of the impeller 20.

The hub 32 of the impeller 20 is drivably connected to a positive displacement gear pump 34. The pump 34 thus is driven whenever the engine 10 is in operation. It functions as fluid pressure source for an automatic control system that will be described in part in other portions of this specification.

The hub of turbine 22 is connected to a central turbine shaft 36 which in turn is connected to a clutch drum 38. This drum forms a part of a multiple disc clutch assembly 40 and defines an annular cylinder 42 within which is slidably positioned an annular piston 44. Multiple friction discs 46 are externally splined to the interior of drum 38 and are situated in interdigital relationship with respect to cooperating friction discs 48. These discs 48 are carried drivably by an externally splined clutch element 50 which is connected to a torque delivery shaft 52.

Fluid pressure can be admitted to the pressure chamber defined by the cylinder 42 and the piston 44 through a clutch pressure feed passage 54. The pressure acting upon the piston 44 is transferred to the friction discs 46 and 48 by means of a Belleville spring washer 56 which is anchored at its outer periphery to the interior of the drum 38.

The pressure force applied to the piston 44 thus causes the discs 46 and 48 to become frictionally engaged to establish a driving connection between shaft 36 and shaft 52. Drum 38 includes an extension 58 which carries externally splined discs 60. These are situated in interdigital relationship with respect to discs 62 carried by a drum 64. A front brake band 66 surrounds drum 64 and may be applied and released by means of a suitable fluid pressure operated brake servo 68. The servo 68 includes a cylinder 70 within which is positioned a piston 72. This piston is operatively connected by means of a suitable linkage system 74 to one end of the brake band 66.

Drum 64 defines an annular cylinder 76 within which is positioned an annular piston 78. Fluid pressure is admitted to the cylinder 76 through a clutch pressure feed passage 80.

The drum 64 is connected to a sun gear sleeve shaft 82 which in turn extends to a relatively large pitch diameter sun gear 84 for a compound planetary gear unit 86. A set of long planet pinions 88 engages sun gear 84. A set of short planet pinions 90 engages a smaller diameter sun gear 92, and also the planet pinions 88. Pinions 88 engage a ring gear 94 which in turn is connected to a power output shaft 96. A rear pump 98 is drivably connected to the shaft 96 and functions to supplement the action of the front pump 34.

A common carrier 100 rotatably supports the set of planet pinions 90 as well as the set of planet pinions 88. It includes a brake drum 102 about which is positioned a rear brake band 104. This drum 104 can be applied and released by means of a fluid pressure operated brake servo 106. The servo includes a cylinder 108 within which is positioned a servo piston 110. The piston 110 is connected mechanically to the brake band 104 by a suitable linkage mechanism 112.

Pressure can be admitted through the pressure chamber defined by the piston 110 and the cylinder 108 through the pressure feed passage 114. Brake band 104 can be applied in this fashion during continuous operation in the low speed ratio range and during operation in reverse.

Carrier 100 defines an outer race for an overrunning brake identified by reference character 116. An inner race for the brake 116 is defined by a stationary wall 118 which may be connected to a stationary housing 28. Sun gear 92 is connected directly to shaft 52 so that when the front clutch 40 is applied, a direct connection is established between sun gear 92 and the shaft 36. The rear clutch of which discs 60 and 62 from a part is identified generally by reference character 120. When it is applied, a direct connection is established between shaft 36 and sun gear 84.

A fluid pressure governor valve mechanism 122 is connected drivably to the power output shaft 96 and functions to supply a pressure signal in passage 124 that is related in magnitude to the driven speed of shaft 96. The vehicle traction wheels 126 can be connected to the shaft 96 through a suitable driveline.

To establish low speed ratio operation, the front clutch 40 is applied. Turbine torque developed by the torque converter unit 18 then is distributed through shaft 36 and through the applied front clutch to shaft 52, thereby driving sun gear 92. Overrunning brake 116 acts as a reaction member and holds the common carrier 100 in a stationary position. Ring gear 94 thus is driven at a reduced speed and its motion is imparted to the power output shaft 96.

To establish intermediate speed ratio operation, the front clutch 40 remains applied and the front brake 66 is applied. This anchors sun gear 84 so that it acts as a reaction member. Overrunning brake 116 freewheels under these conditions. Thus the ring gear and the power output shaft 96 are driven at an increased speed ratio that is greater than the low speed ratio but less than unity.

To establish high speed ratio direct drive operation, both clutches are applied simultaneously and the brake band 66 is released. This locks together the sun gears and the elements of the gear system thus rotate in unison with a 1–1 speed ratio. Overrunning brake 116 freewheels as it does during intermediate speed ratio operation.

To establish reverse drive, the rear brake band 104 is applied, the front clutch 40 is released and the rear clutch 120 is applied. Brake band 66, of course, is released. Turbine torque then is delivered from shaft 36 through the applied rear clutch to shaft 82 thus driving sun gear 84. The carrier acts as a reaction member since it is anchored by the rear brake band 104. The ring gear 94 thus is driven in a reverse direction.

Distribution of fluid pressure to the servos shown in FIGURE 1 is controlled by a control valve system 128. Fluid pressure from the front pump 34 is distributed to the valve system 128 through a high pressure fluid feed passage 130. The magnitude of the pressure in passage 130 is regulated by a main regulator valve system 134 which communicates with the passage 130 through a branch passage 136. A low pressure fluid supply passage for the pump 34 is shown at 138 and it communicates with the transmission sump disposed in the lower portion of the transmission housing 28.

The servo piston 72 and servo cylinder 70 cooperate to define a pair of pressure chambers 140 and 142. When both chambers 140 and 142 are pressurized, the piston 72 moves to a brake releasing position. If chamber 142 is exhausted, however, the piston 72 moves to a brake applying position. During operation of the transmission mechanism in the forward drive range, chamber 140 can be pressurized continuously.

A throttle valve mechanism 144 is capable of supplying a pressure signal that is related in magnitude to the torque requirements of the mechanism. This signal is distributed to the control system through a throttle pressure passage 146. The throttle valve mechanism includes a movable valve element that is connected to a flexible diaphragm 148 which forms a part of a vacuum servo assembly 150. The pressure chamber on one side of the diaphragm 148, which is subjected to engine intake manifold pressure, is connected to the carburetor throat 12 by means of an engine intake manifold pressure passage 152.

The control valve system 128 includes shift valves that respond to the throttle pressure signal made available to them through passage 146. They respond also to the governor pressure that is made available to the system 128 by passage 124.

Throttle pressure is distributed to the main regulator valve system through a boost pressure passage 149. Governor pressure is distributed also to the main regulator valve system through a passage 151. The magnitude of the regulated pressure maintained by the main regulator valve system 134 thus depends upon the magnitude of the throttle pressure signal and the governor pressure signal.

A downshift control valve 153 is under the control of the vehicle operator. It is connected by means of a linkage 154 to the vehicle engine carburetor accelerator pedal 156. The linkage 154 establishes a connection between the carburetor throttle valve and the accelerator pedal 156 as indicated. The main regulated control pressure is distributed to the downshift valve 153 through a branch passage 158 which communicates with the passage 130. The output pressure of the valve 153 is distributed to the control valve system 128 through the passage 160 so that the automatic operation of the shift valves in the valve system 128 can be overruled when the engine carburetor throttle valve is moved to a wide open position.

Figure 2:
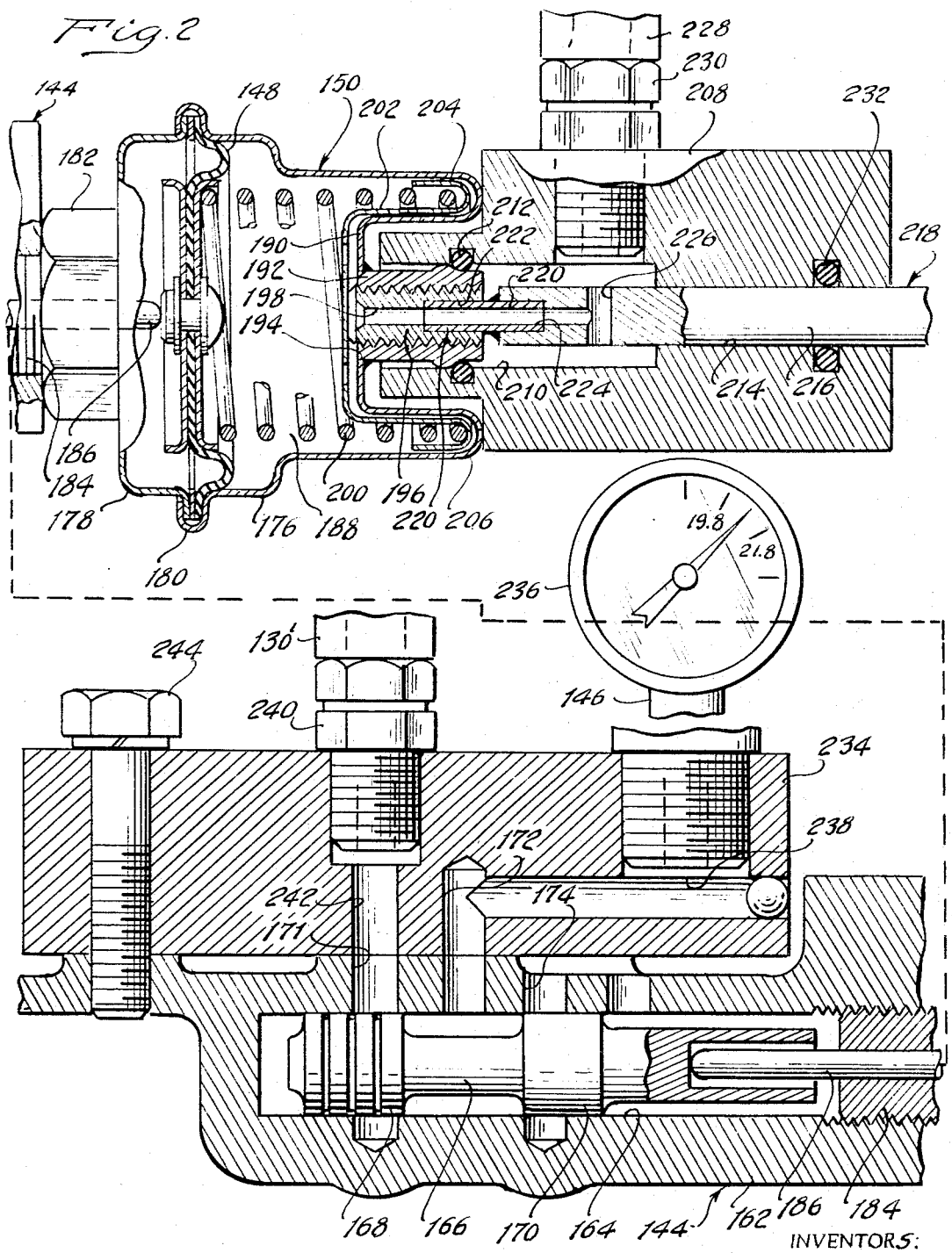
FIGURE 2 shows a manifold pressure operated servo and throttle valve mechanism for use in a control system of the type schematically shown in FIGURE 1.

Referring next to FIGURE 2, the throttle valve system 144 includes a valve body 162 within which is formed a valve chamber 164. A double land valve spool 166 is situated within the chamber 164. It includes two valve lands 168 and 170. Control pressure from the front pump 34 communicates with the valve chamber 164 through a pressure port 171. Throttle pressure is distributed from chamber 164 through the throttle pressure port 172. Port 172 normally communicates with the chamber 164 at a location intermediate valve lands 168 and 170. An exhaust port is shown at 174.

The vacuum pressure operated servo 150 includes two housing parts 176 and 178. These are secured together at their margins 180 by turning one margin over the other. The flexible diaphragm 148 is secured at its margin between the cooperating margins of the housing parts 176 and 178.

Housing part 178 carries a threaded adaptor 182 having a threaded portion 184 that is received within a cooperating internally threaded portion of the valve chamber 164. A motion transmitting stem 186 is disposed between valve spool 166 and the diaphragm 148 so that movement of the diaphragm will result in an adjustment of the valve spool 166.

The housing part 176 cooperates with the diaphragm 148 to define a vacuum pressure chamber 188 having an end wall 190. An internally threaded fitting 192 is welded or otherwise secured within an opening 194 in the wall 190. An externally threaded adjusting element 196 is received within a threaded opening in fitting 192 and is formed with a central passage 198 which communicates with the chamber 188.

A compression spring 200 is situated between the diaphragm 148 and a spring seat member 202. This member includes a portion 204 which is disposed within a reentrant portion 206 of the housing part 176. Portion 204 of the seat member 202 is engaged by the spring 200. The central portion of the seat member 202 is engaged by the end of the adjusting element 196. When the adjusting element is rotated, it moves in either a left-hand direction or a right-hand direction, as viewed in FIGURE 2, thereby adjusting the position of the seat member 202. This in turn varies the compression of the spring 200.

The control pressure passage 152 may be in the form of a tube that can be received over the fitting 192 thereby establishing a connection between chamber 188 and the interior of the engine intake manifold. Upon an increase in the magnitude of the pressure in the engine intake manifold the net force acting upon the diaphragm 148 in a left-hand direction is increased. This tends to cause an increase in the degree of communication between port 171 and port 172 while decreasing the degree of communication between port 172 and 174. This results in an increase in pressure in passage 146. The region of the valve chamber 164 on the left-hand side of the land 168 communicates with the port 172 through a feed-back passage not shown. Conversely, a decrease in the pressure in the engine intake manifold will result in a decrease in the pressure in passage 146.

To increase the throttle pressure for any given engine intake manifold pressure the adjusting element 196 may be moved so that the spring seat member 202 will be shifted slightly in a left-hand direction. Suitable calibrating adjustments of the throttle valve system can be accomplished in this fashion. To facilitate this adjustment the tube that defines passage 152 is removed from the fitting 192 and an adaptor 208 is positioned over the fitting 192. Adaptor 208 is formed with an end opening 210 that receives the adaptor 192. A fluid seal 212 is employed to establish an air tight connection between chamber 188 and the interior portion of the chamber 210.

Opening 210 communicates with an opening 214 within which is positioned the shank 216 of an adjusting wrench 218. The wrench is formed with a hexagonal part 220 which can be received within a cooperating hexagonal opening 222 formed in the end of the adjusting element 196. Member 220 is formed with an opening 224 which communicates with the opening 198. It communicates also with an opening 226 formed in the end of the shank 216.

A test line 228 communicates with the opening 210 and is connected to the adaptor 208 by means of a threaded fitting 230.

The shank 216 is surrounded by a seal 232 which helps to isolate the opening 210 from the ambient atmosphere. During normal operation of the control system, the test line 228 and the adaptor 208 would not be employed. Instead passage 152 would be connected directly to the fitting 192. In order to provide appropriate adjustment and calibration of the throttle valve, however, the passage 152 can be disconnected temporarily and the adaptor 208 then can be received in place as shown in FIGURE 2. Line 228 can be subjected to a pressure that is less than atmospheric pressure and which can be maintained at a known regulated value, such as 15 inches of mercury. When the adaptor 208 is in place the wrench 218 then can be maneuvered into place so that rotary adjustment of the adjusting element 196 can take place. The tension of the spring 200 then can be controlled.

In order to determine what influence the adjustment of the element 196 may have, a test fixture can be connected readily to the valve body 162. It includes a body portion 234 which carries a throttle pressure regulating gauge 236. The gauge communicates with a passage 238 which communicates with port 172. A line pressure passage 130′ is connected to the body 234 by a threaded fitting 240. It communicates with a passage 242 which communicates in turn with the port 171. The adaptor body 234 can be connected to the valve body 162 by a clamping bolt 244.

Figure 3:
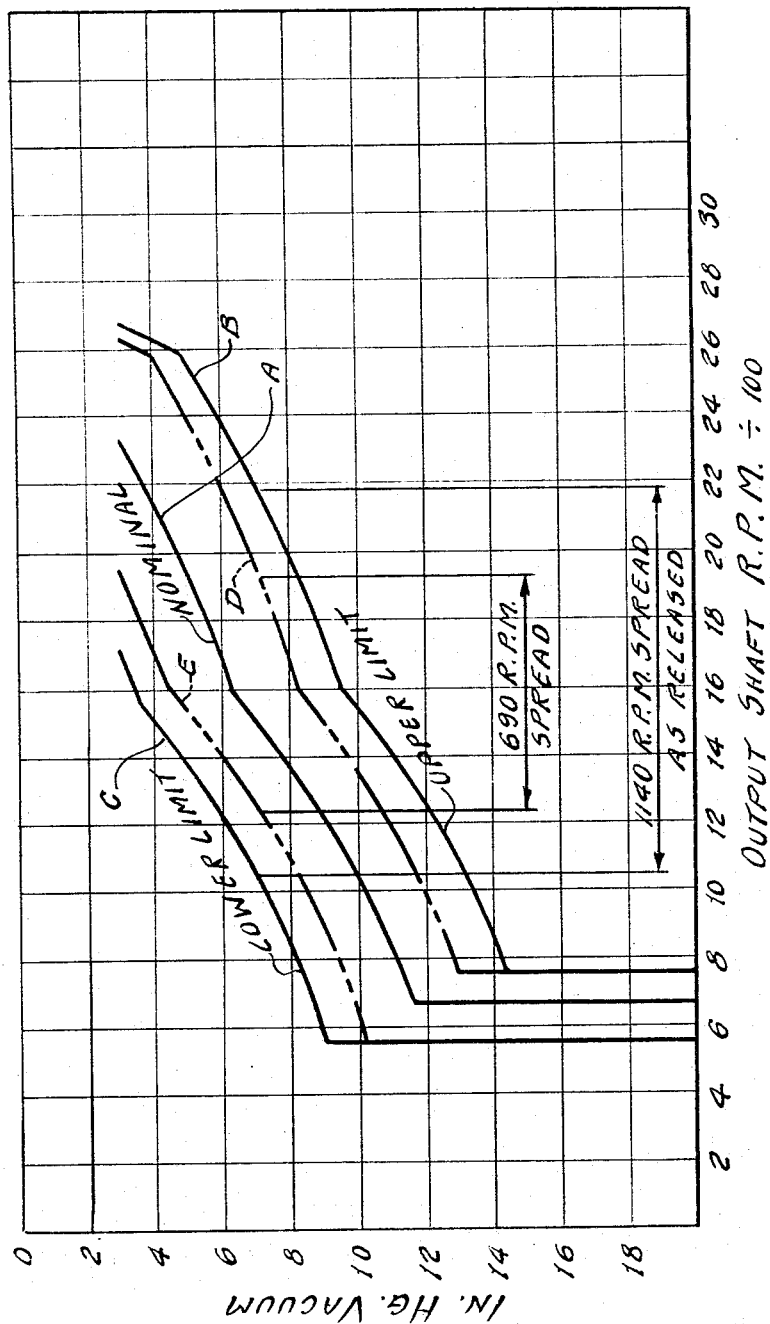
FIGURE 3 shows a shift point curve for a control valve system of the type shown in FIGURE 1.

In FIGURE 3 we have shown the variation in the shift points for any engine intake manifold pressure. In a given transmission design the speed at which a 2–3 upshift will occur for any given engine intake manifold pressure is shown by the curve A. This represents the nominal or average value for the shift points for any given engine intake manifold pressure. In practice, however, the shift points vary substantially from the nominal value. In one extreme case the shift points may be represented by the curve B. In the opposite extreme the shift points are represented by the curve C. The actual shift thus would occur at some location intermediate the curves B and C for any given engine intake manifold pressure.

By making an appropriate adjustment in the manifold pressure operated servo for the throttle valve system the range of speeds at which upshifts will occur for any given engine intake manifold pressure can be reduced so that the two outside extremes can be represented by the curves D and E. The curve E, of course, still represents the nominal or average value for the shift points following an appropriate adjustment of the vacuum pressure operated servo.

By moving the spring seat member 202 in a left-hand direction as viewed in FIGURE 2, the shift point curve will have moved to the right. If, however, the spring seat member is backed off in a right-hand direction as viewed in FIGURE 2, the shift point curve of FIGURE 3 will be shifted to the left.

Figure 4:
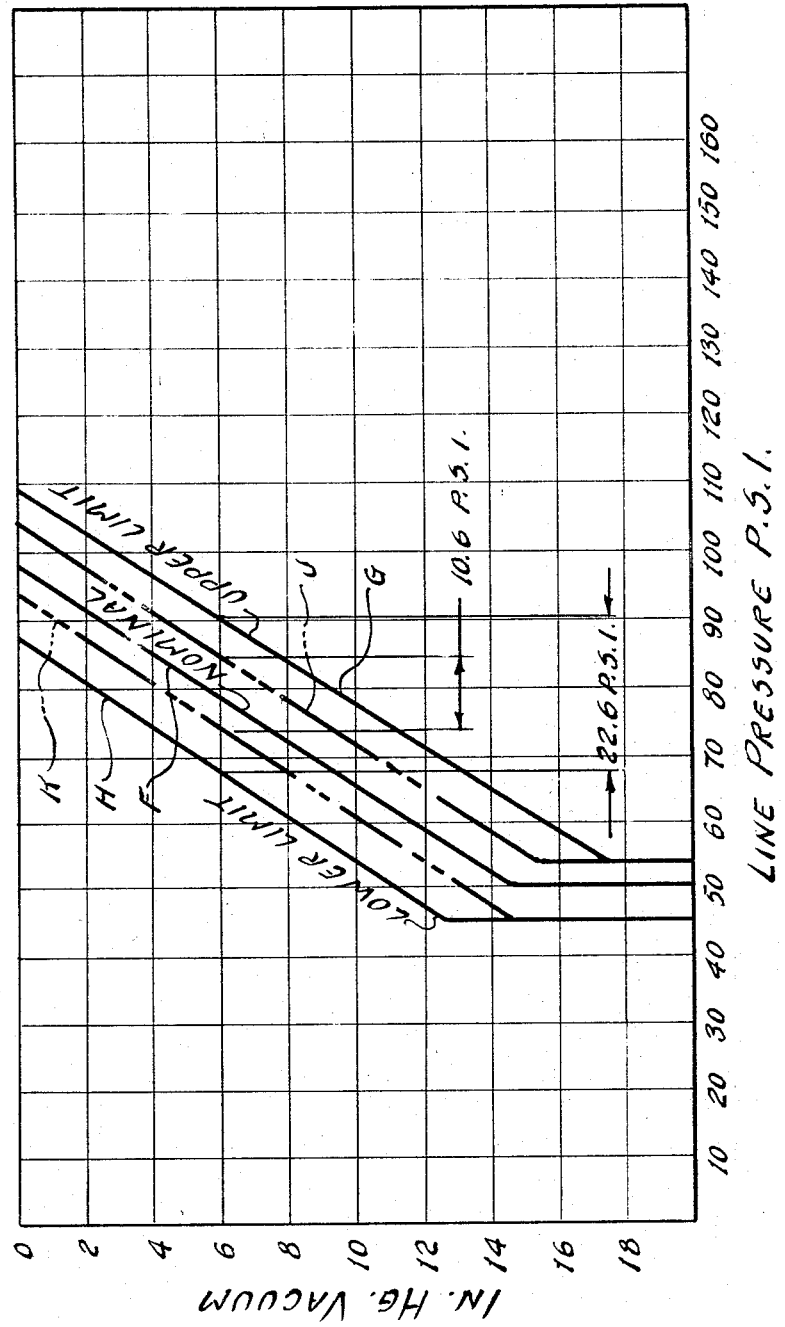
FIGURE 4 shows a shift feel curve for a valve system of the type shown in FIGURE 1.
Figure 5:
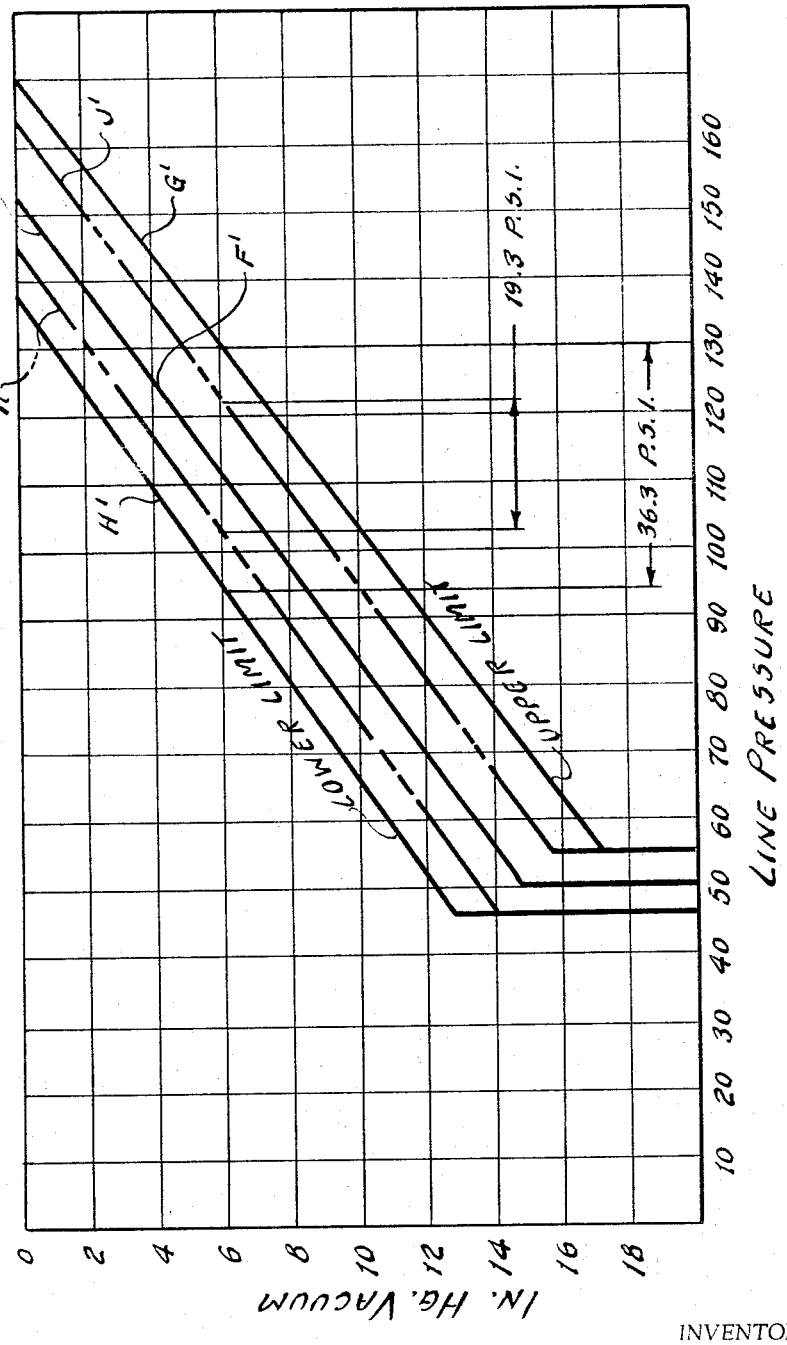
FIGURE 5 shows a relationship between line pressure and engine intake manifold pressure that is useful in establishing front clutch capacity and, FIGURE 6 is a curve similar to FIGURE 1 but which is useful in establishing reverse brake band capacity.
Figure 6:
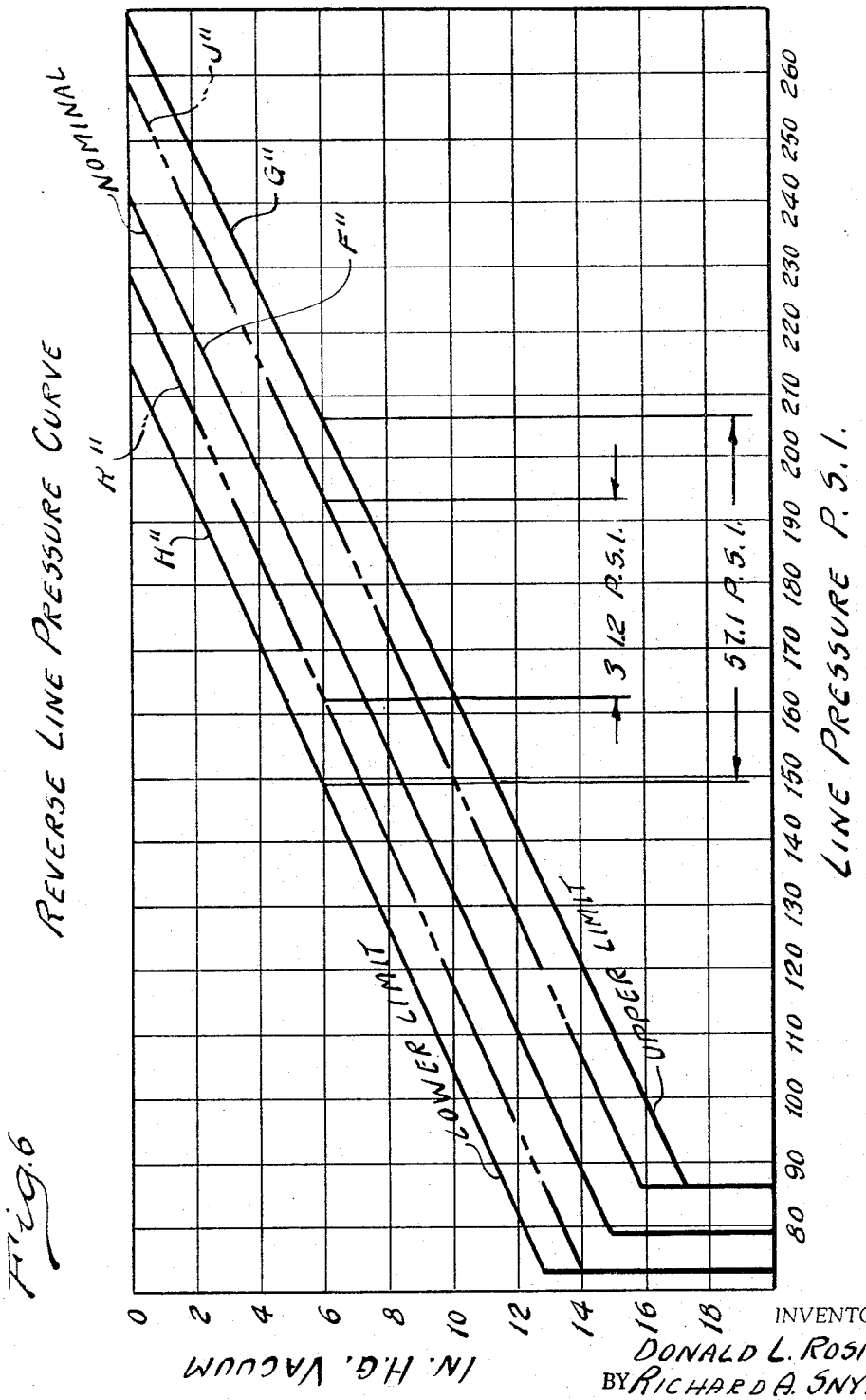

In FIGURES 4, 5 and 6 we have shown the relationship between line pressure and engine intake manifold pressure. As mentioned previously, the regulator system is influenced by engine intake manifold pressure so that the operating pressure level maintained in the control valve system is influenced by the torque transmitting requirements. The relationship shown in FIGURE 4 is that which is obtained in a control valve system of the type shown in the Leonard et al. application referred to in the introductory portion of this specification. The average or nominal controlled pressure maintained by the regulator valve system is shown in FIGURE 4 by the curve F. It is possible, however, for the actual line pressure to vary from the nominal value for any given transmission design. The extreme limits are indicated by the curves G and H.

By making an appropriate adjustment of the spring tension for the engine manifold pressure operated servo, the range over which the line pressure may vary for any given transmission design can be reduced so that the limits are defined by the curves J and K. This results in a substantial improvement in the shift feel since the clutch and brake servos and the shift timing valves for the valve system can be calibrated to operate with a control pressure that varies within a narrower range.

The curves of FIGURE 4 represent the variation in control pressure for the various values of the engine intake manifold pressure when the vehicle is operating at a relatively high speed and after the characteristics of the regulator valve system have been modified by the governor valve signal.

The curves of FIGURE 5 correspond to the curves of FIGURE 4 although they have been obtained under stall conditions prior to any influence of the governor pressure signal upon the regulator valve system. Thus the curves of FIGURE 5 can be used to establish the proper front clutch capacity. This can be done more accurately, of course, after an appropriate adjustment in the vacuum pressure operated servo is made since the limits within which the control pressure will vary for any given engine intake manifold pressure are reduced substantially. The curves of FIGURE 5 which correspond to the curves of FIGURE 4 have been identified by similar reference characters although primed notations have been added.

In FIGURE 6 there is shown a curve that is similar to the curves of FIGURES 4 and 5, but which represents the control pressure variations after the transmission mechanism is conditioned for reverse drive operation. A hydraulic connection between the manually operated range selector valve and the regulator valve system causes an auxiliary pressure to act upon the regulator valve to cause an increase in the magnitude of the regulated control pressure. The relationship between control pressure and engine intake manifold pressure that is shown in FIGURE 6 is obtained after the regulating characteristics of the main regulator valve system have been modified by this auxiliary pressure. The curves of FIGURE 6 thus can be used to determine reverse brake capacity.

The curves of FIGURE 6 that correspond to the curves of FIGURE 4 have been indicated by similar reference characters although double primed notations have been added.

Having thus described a preferred form of our invention, what we claim and desire to secure by United States Letters Patent is:

1. An automatic control for a multiple speed ratio power transmission mechanism having a gear system for connecting an engine to a driven member, said engine having a fuel-air intake manifold, a fluid pressure source, fluid pressure operated servos, clutch and brake means for controlling the relative motion of elements of said gear system and responding to operation of said servos, conduit structure including a control valve system for establishing a connection between said pressure source and said servos, a regulator valve mechanism in fluid communication with said source for maintaining a desired operating pressure level in said control system, a source of a governor speed signal that is proportional in magnitude to the driven speed of said driven member, a throttle pressure valve mechanism for establishing a pressure signal that is related in magnitude to the operating torque requirements of the transmission mechanism, means for distributing said pressure signals to said control system for influencing the operation thereof, said throttle valve mechanism comprising a movable valve element, a manifold pressure operated servo comprising a servo body, a diaphragm disposed within said body and mechanically connected to said movable valve element, one portion of said body and said diaphragm cooperating to define a manifold pressure chamber, a manifold pressure passage extending between said engine manifold and said manifold chamber, a diaphragm spring disposed between said diaphragm and said body, a spring seat member disposed within said body and engaging one end of said spring, a fluid fitting connected to said body, said fitting establishing a connection between said manifold pressure passage and said manifold pressure chamber, and an adjusting element threadably connected to said fitting, engageable with said spring seat member, and movable in the direction of the line of action of said spring to adjust said seat member.

2. An automatic control for a multiple speed ratio power transmission mechanism having a gear system for connecting an engine to a driven member, said engine having a fuel-air intake manifold, a fluid pressure source, fluid pressure operated servos, clutch and brake means for controlling the relative motion of elements of said gear system and responding to operation of said servos, conduit structure including a control valve system for establishing a connection between said pressure source and said servos, a regulator valve mechanism in fluid communication with said source for maintaining a desired operating pressure level in said control system, a source of a governor speed signal that is proportional in magnitude to the driven speed of said driven member, a throttle pressure valve mechanism for establishing a pressure signal that is related in magnitude to the operating torque requirements of the transmission mechanism, means for distributing said pressure signals to said regulator valve mechanism and said control system for influencing the operation thereof, said throttle valve mechanism comprising a movable valve element, a manifold pressure operated servo comprising a servo body, a diaphragm disposed within said body and mechanically connected to said movable valve element, one portion of said body and said diaphragm cooperating to define a manifold pressure chamber, manifold pressure passage extending between said engine manifold and said manifold chamber, a diaphragm spring disposed between said diaphragm and said body, a spring seat member disposed within said body and engaging one end of said spring, a fluid fitting connected to said body and projecting therefrom, an adjusting element threadably connected to said fitting and movable in the direction of the line of action of said spring, said manifold pressure passage being adapted to be received over said fitting, said fitting having an internally threaded opening, said adjusting member being received within said opening and engageable with said spring seat, said adjusting element being adapted to be adjusted by a suitable hand tool to effect axial adjustment of said spring seat.

3. An automatic control for a multiple speed ratio power transmission mechanism having a gear system for connecting an engine to a driven member, said engine having a fuel-air intake manifold, a fluid pressure source, fluid pressure operated servos, clutch and brake means for controlling the relative motion of elements of said gear system and responding to operation of said servos, conduit structure including a control valve system for establishing a connection between said pressure source and said servos, a regulator valve mechanism in fluid communication with said source for maintaining a desired operating pressure level in said control system, a source of a governor speed signal that is proportional in magnitude to the driven speed of said driven member, a throttle pressure valve mechanism for establishing a pressure signal that is related in magnitude to the operating torque requirements of the transmission mechanism, means for distributing said pressure signals to said regulator valve mechanism and said control system for influencing the operation thereof, said throttle valve mechanism comprising a movable valve element, a manifold pressure operated servo comprising a servo body, a diaphragm disposed within said body and mechanically connected to said movable valve element, one portion of said body and said diaphragm cooperating to define a manifold pressure chamber, manifold pressure passage extending between said engine manifold and said manifold chamber, a diaphragm spring disposed between said diaphragm and said body, a spring seat member disposed within said body and engaging one end of said spring, a fluid fitting connected to said body, an adjusting element threadably connected to said fitting and movable in the direction of the line of action of said spring, said manifold pressure passage being adapted to be received over said fitting, said fitting having an internally threaded opening to establish fluid communication between said manifold and said chamber, said adjusting member being received within said opening and engageable with said spring seat, said adjusting element being adapted to be adjusted by a suitable hand tool to effect axial adjustment of said spring seat, said body comprising re-entrant portions defining an end wall, said fitting being secured to said end wall and extending axially therefrom with the re-entrant body portions being disposed about it thereby reducing the over-all dimensions of said servo, said spring being disposed in part in said re-entrant portions.

References Cited by the Examiner
UNITED STATES PATENTS

| | | | |
|---|---|---|---|
| 3,094,141 | 6/1963 | Maienknecht | 251—337 X |
| 3,095,755 | 7/1963 | Duffy. | |
| 3,106,104 | 10/1963 | Harry | 74—472 |
| 3,165,008 | 1/1965 | Forster. | |

DAVID J. WILLIAMOWSKY, *Primary Examiner.*

DON A. WAITE, *Examiner.*

M. H. FREEMAN, *Assistant Examiner.*